US012764383B2

(12) United States Patent
Chen et al.

(10) Patent No.: US 12,764,383 B2
(45) Date of Patent: Oct. 13, 2026

(54) USER INTERFACE FOR TELEVISION CHANNEL SURFING

(71) Applicant: Adeia Guides Inc., San Jose, CA (US)

(72) Inventors: Tao Chen, Palo Alto, CA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 132 days.

(21) Appl. No.: 18/543,020

(22) Filed: Dec. 18, 2023

(65) Prior Publication Data

US 2025/0203160 A1 Jun. 19, 2025

(51) Int. Cl.

| | |
|---|---|
| ***H04N 21/443*** | (2011.01) |
| ***H04N 21/422*** | (2011.01) |
| ***H04N 21/431*** | (2011.01) |
| ***H04N 21/485*** | (2011.01) |

(52) U.S. Cl.

CPC ... *H04N 21/4438* (2013.01); *H04N 21/42204* (2013.01); *H04N 21/4314* (2013.01); *H04N 21/4316* (2013.01); *H04N 21/4852* (2013.01)

(58) Field of Classification Search

CPC ......... H04N 21/4438; H04N 21/42204; H04N 21/4314; H04N 21/4316; H04N 21/4852; H04N 21/812

See application file for complete search history.

(56) References Cited

U.S. PATENT DOCUMENTS

2004/0184523 A1* 9/2004 Dawson ............. H04N 21/6377 348/E7.071
2007/0115391 A1* 5/2007 Anderson ................ H04N 5/45 348/565
2010/0077433 A1* 3/2010 Beyabani ........... H04N 21/4722 725/43
2010/0275229 A1* 10/2010 Civanlar ........ H04N 21/440227 725/39
2015/0181132 A1* 6/2015 Kummer ............ H04N 21/4622 348/598

(Continued)

OTHER PUBLICATIONS

Triplelift—The Anatomy of an In-Show Placement, Oct. 4, 2022 https://triplelift.com/blog/the-anatomy-of-an-in-show-placement/.

(Continued)

*Primary Examiner* — Michael R Telan
(74) *Attorney, Agent, or Firm* — HG LAW LLP

(57) ABSTRACT

Methods and systems for enabling a user to browse a selection of video streams are disclosed. The interface disclosed herein provides two types of video panels. A first type is a video stream browse panel which shows a different video stream in response to receiving a video stream browsing command. The second type is a video stream monitor panel which continues to show the same video stream on the screen even when a video stream browsing command is received. By enabling a user to flag a video stream browsing panel as a video stream monitor panel, the user is able to build a multi-view presentation showing a video stream which they wish to monitor, and a video stream browser panel which they can use to surf through other video streams. On clearing the flag on a video stream monitor panel, the panel is removed from the screen. Because the flag can be set or cleared using a single user action, the ease of use of the user interface is improved.

18 Claims, 18 Drawing Sheets

(56) References Cited

U.S. PATENT DOCUMENTS

| | | | | |
|---|---|---|---|---|
| 2016/0054905 A1* | 2/2016 | Chai | H04N 21/4312 | 715/719 |
| 2023/0097914 A1* | 3/2023 | Balasubramanian | H04N 21/4852 | 700/94 |
| 2023/0164387 A1* | 5/2023 | Bustamante | H04N 21/21805 | 725/12 |
| 2024/0129592 A1* | 4/2024 | Guan | H04N 21/4858 | |

OTHER PUBLICATIONS

As Viewers Flock to Fast, Are Advertisers Ready? Adexchanger Content Studio. Apr. 25, 2023 https://www.adexchanger.com/content-studio/as-viewers-flock-to-fast-are-advertisers-ready/.

MLB.TV Help Center—How to Use Multiview https://www.mlb.com/live-stream-games/help-center/subscription-access-how-to-use-multi-view.

* cited by examiner

Fig. 3A

| Channel Source Directory | |
|---|---|
| Channel ID | Source Address |
| Channel A | https://cdn1.com/mediaco1/chA |
| Channel B | https://cdn1.com/mediaco1/chB |
| Channel C | https://cdn1.com/mediaco2/chA |
| Channel D | https://cdn1.com/mediaco2/chB |
| Channel E | https://cdn1.com/mediaco2/chC |

Fig. 3B

| 302 | 304 | 306 | 308 | 310 | 312 | 314 | 316 |
|---|---|---|---|---|---|---|---|
| Panel Configuration | | | | | | | |
| Panel # | Channel Being Shown | Panel Type | Panel Creation Time (updated on Type Change) | Panel Area | Video Bandwidth Share | Audio Status | Subtitle / CC Status |
| 1 | A | Monitor | 2023-11-23\|13:41.46 | (x1,y1; x2,y2) | 40% | Muted | On |
| 2 | C | Monitor | 2023-11-23\|13:57.95 | (x2,y2; x3,y3) | 40% | Muted | On |
| 3 | E | Browser | 2023-11-23\|13:58.33 | (x4,y4; x5,y5) | 20% | Unmuted | Off |

(Channel change)

(Rendering)

(Handling lock cmd)

(Handling unlock cmd)

Fig. 11

| Ad Impression Report | | |
|---|---|---|
| Start Time | 2023-11-23\|13:57.77 | 1102 |
| Client IP Address | f6d2:5751:5f25:0000:0000:97eb:0455:56c4 | 1104 |
| Campaign ID | 55 | 1106 |
| Advert ID | 42 | 1108 |
| Client Location | Spokane | 1110 |
| Application ID | App 72.0.2133.24 (64-bit) | 1112 |
| Operating System | Windows 11 18076.7835 | 1114 |
| Advertiser | Lynxcars | 1116 |
| Publisher | FASTAds | 1118 |
| Channel ID | A | 1120 |
| Ad Display Duration | 30 | 1122 |
| Screen Fraction | 0.25 | 1124 |
| Ad Display Area | 280mm * 160mm | 1126 |

USER INTERFACE FOR TELEVISION CHANNEL SURFING

BACKGROUND

Linear television conventionally provides viewers with a plurality of channels to select from. Each channel includes television programs which are transmitted in accordance with a predetermined schedule. Whilst linear television has in the past largely been delivered over terrestrial, cable or satellite broadcast links, the delivery of linear television by streaming over the Internet is growing.

In any multi-channel television system, it is necessary to provide users with a user interface which enables them to select which of the plurality of channels is displayed on their display apparatus. Conventional approaches include using a remote control unit to increment or decrement the channel number (using channel-up and channel-down buttons), enter a channel number, or interact with an interactive program guide.

Despite the widespread availability of interactive program guides which provide details of what programs are being broadcast at different times on different channels, many viewers choose to 'channel surf' (sometimes known as channel zapping) using the channel-up/channel-down buttons on the remote control. This behavior is probably driven by the extremely easy user interaction required, namely the repeated pressing of the same button on the remote control. In part because the human-machine interaction is so simple, viewers will willingly traipse through the channels one-by-one until they happen to alight upon a channel which they wish to continue watching.

In cases where a channel includes advertisements, the display of an advertisement on that channel can trigger a user to channel surf in order to find another channel on which adverts are not currently being shown. Sometimes the viewer will swap back to the original channel in order to see whether the program they were watching has restarted on the originally selected channel. For advertisers, this behavior is undesirable since it results in the viewer not consuming the advert in full. For viewers, and the content provider, this is unsatisfactory because it disrupts the viewer's enjoyment of the content—in particular because the viewer can miss the part of the program immediately following the restart of the program.

There is a need for a better viewer interface for channel selection.

BRIEF SUMMARY

According to an aspect of the disclosure, there is provided a media device arranged in operation to provide a user with an interface which features two types of video panel, namely a video stream browser panel type and a video stream monitor panel type. If a particular video stream is displayed in a video stream browser panel, then the user may set that particular video stream as a monitor stream. A monitor stream is a stream whose presentation on the screen should continue even on receipt of a video stream (e.g., channel) change command at the video display apparatus. To accommodate the user's desire to view another video stream (e.g., another channel), the video display apparatus may generate a video stream browser panel for display along with a video stream monitor panel showing the monitor stream. In some cases, when the user sets a particular video stream appearing in a video stream browser panel as a monitor stream, the video stream browser panel will be replaced by two video panels, one of which is a video stream monitor panel (showing the monitor stream), and the other of which is a video stream browser panel (showing the video streams through which the user is surfing).

In some cases, in order to accommodate both a video stream monitor panel and a video stream browser panel on a screen which was previously showing only an initial video panel, the video stream monitor panel and the video stream browser panel are sized and shaped to fit within the area previously occupied by the initial video panel.

The user is thus able to build a multi-view presentation showing both a video stream which they wish to monitor, and a video stream browser panel which they can use to surf through other video streams.

In some embodiments, a locked/unlocked flag or panel type is associated with each video panel displayed on the screen. The video display apparatus may respond to a user command to lock a browser video panel by creating a monitor video panel showing the same video stream. The video display apparatus may respond to a user command to unlock a monitor video panel either by replacing the monitor video panel with a browser video panel or, if a browser video panel is already on the screen, removing the monitor video panel from the screen. This allows the user to build up a collection of monitored video streams on the screen, and later remove some or all of the monitored video streams from the screen.

A straightforward user interface results since the flag (e.g., 'locked'/'unlocked') can be set or cleared using a single user action. The single user action may be one press of a button on a remote control unit. The button may be a single button offering a lock/unlock toggle control, or separate lock and unlock buttons may be provided.

The video streams through which the user browses may be a collection of Free Ad-Supported Television (FAST) channels.

In some cases, the setting of the locked flag on a video stream browser panel may happen automatically in response to a predetermined type of content (e.g., an advertisement) appearing in the video stream.

In some embodiments, the video display apparatus stores a panel configuration data structure representing video panel areas and the associated video stream source for each video panel. The panel configuration data structure may further include audio settings (e.g., volume, audio mute, subtitles, closed captions). Additionally, the panel configuration can be given a name, such as "NFL Sunday," where selecting NFL Sunday retrieves a predetermined or preexisting configuration, such as 3 windows or panels or video players that play content from 3 different sources (e.g., 3 different channels) where the first player outputs video and audio, and the remaining 2 players output just video. Such settings are part of the panel configuration data structure.

BRIEF DESCRIPTION OF DRAWINGS

There now follows, by way of example only, a description of some example embodiments of the present disclosure. This description is given with reference to the accompanying drawings, in which:

FIGS. 3A and 3B illustrate data structures used in the content distribution system of FIG. 2;

FIG. 11 illustrates an advert impression report data structure; and

DETAILED DESCRIPTION

Figure 1A:
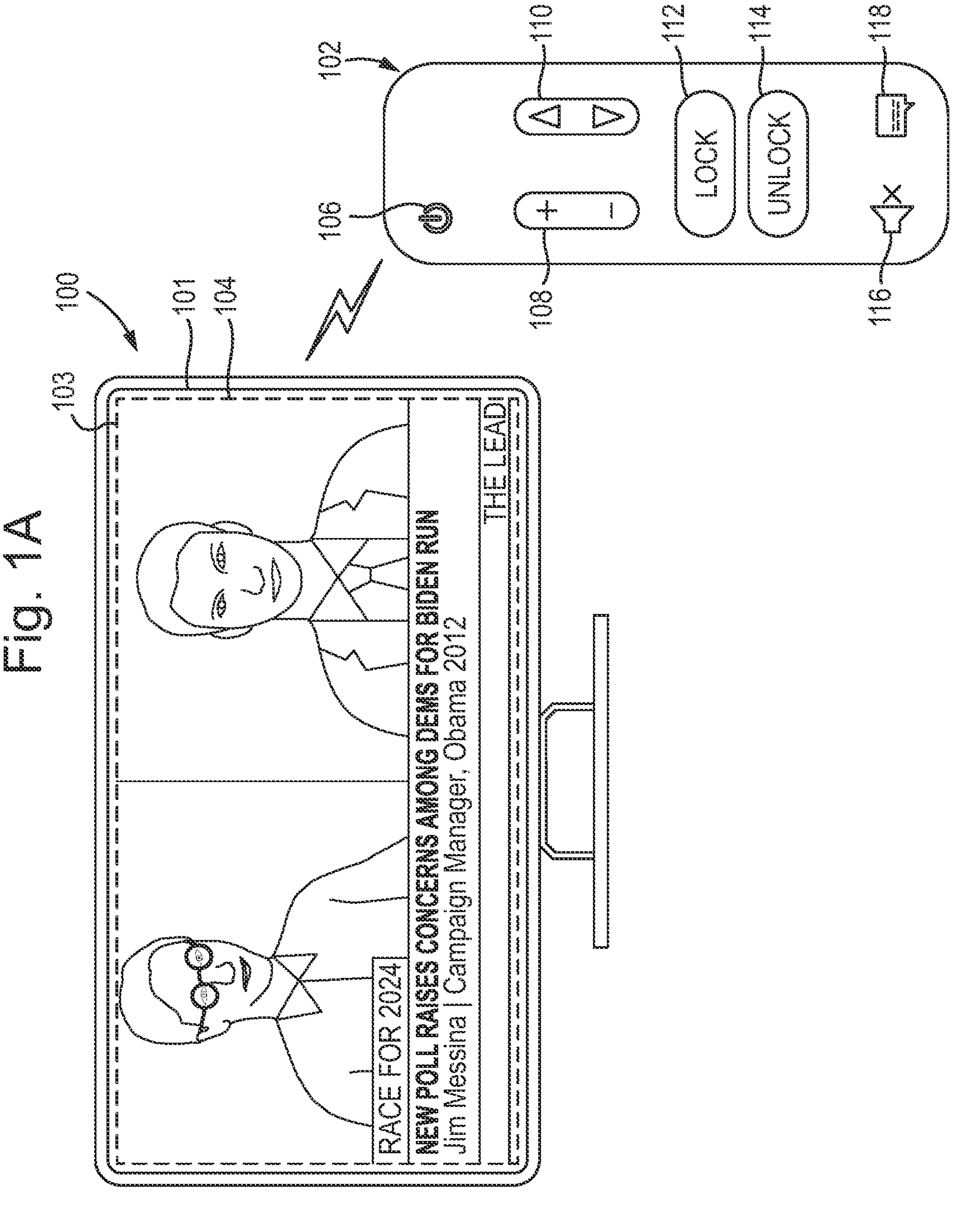
FIGS. 1A to 1I illustrate a sequences of screens which may be displayed to a user of a video display apparatus.

In use of some embodiments of the present disclosure, a user of a media device 100 is presented with the output of a television channel on a display screen 101 (FIG. 1A). The media device 100 may be a device having a built-in display screen, for example, a smart television, a laptop computer, a smartphone, or a tablet. Alternatively, the media device 100 may be in communication with an external display screen. For example the media device may be a desktop computer, a gaming console, a set-top box or a streaming media player. The media device 100 may be provided with a remote control unit 102.

The display screen 101 features a video panel area 103 which fills or substantially fills the display screen 101. The video panel area 103 features one or more video panels 104. Each video panel 104 may feature one or more video panel framing elements such as a border, title bar etc., but in example shown in FIG. 1A, the video panel 104 has no video panel framing elements.

The remote control 102 has a number of control buttons which the user can press in order to control the operation of the media device 100 (only some buttons relevant to the operation of the embodiment described here are shown in the Figure).

The buttons include a power on/off button 106, a volume up/down button 108, a channel up/down button 110, channel lock and unlock buttons 112,114 (the purpose of these buttons will be explained below), a mute button 116 and a subtitles on/off button 118.

In another embodiment, instead of the channel lock/unlock buttons, a rocker switch like those used on the volume and channel controls may be used instead of two separate buttons. In yet another embodiment, the remote control unit may feature one or more pressure sensors under the channel change button 110 which detects the difference between a relatively light button press and a relatively hard button press and sends a signal to the media device 100 indicative of the which type of button press was performed by the user. The media device 100 is configured to respond to the light button press as a channel change command and the heavy button press as a channel lock command followed by a channel change command (e.g., channel up or down). In addition, or instead of, the above-mentioned controls, the media device 100 or the remote control unit 102 may provide a voice-control interface to the media device 100.

In some embodiments, instead of, or in addition to, channel-up and channel-down commands (which increment or decrement the channel number respectively), the remote control may have buttons representing each of the digits 0 to 9 to enable the user to select a channel by entering a channel number.

Video panel 104 is an example of what will be referred to herein as a channel browser video panel. A user is able to change the video stream fed to a channel browser video panel by activating channel change controls—for example, the channel change button or buttons provided on remote control 102.

In some cases, the media device may generate for display streamed video from a Free Ad-Supported Streaming Television channel (a FAST channel). FAST channels offer a similar viewing experience to traditional linear TV channels. In particular, trick-play functions (including ad-skipping) are not supported.

In a manner reminiscent of traditional linear TV systems, FAST channels can be arranged into a channel line-up (an ordered channel list). Such a channel list (e.g., as part of an electronic program guide) may be fetched from an external source. The application software may be installed on the device, or may instead be provided in the form of mobile code (e.g., JavaScript) run by an interpreter or just-in-time compiler installed on the device (e.g., a runtime system provided as part of a web browser). The user may be able to select which channels are included in a channel line-up, and alter the order of the channels in the channel line-up. Alternatively, or additionally, the application may automatically control which channels are included in the channel line-up, and automatically alter the order of the channels in the channel line-up.

Figure 1B:
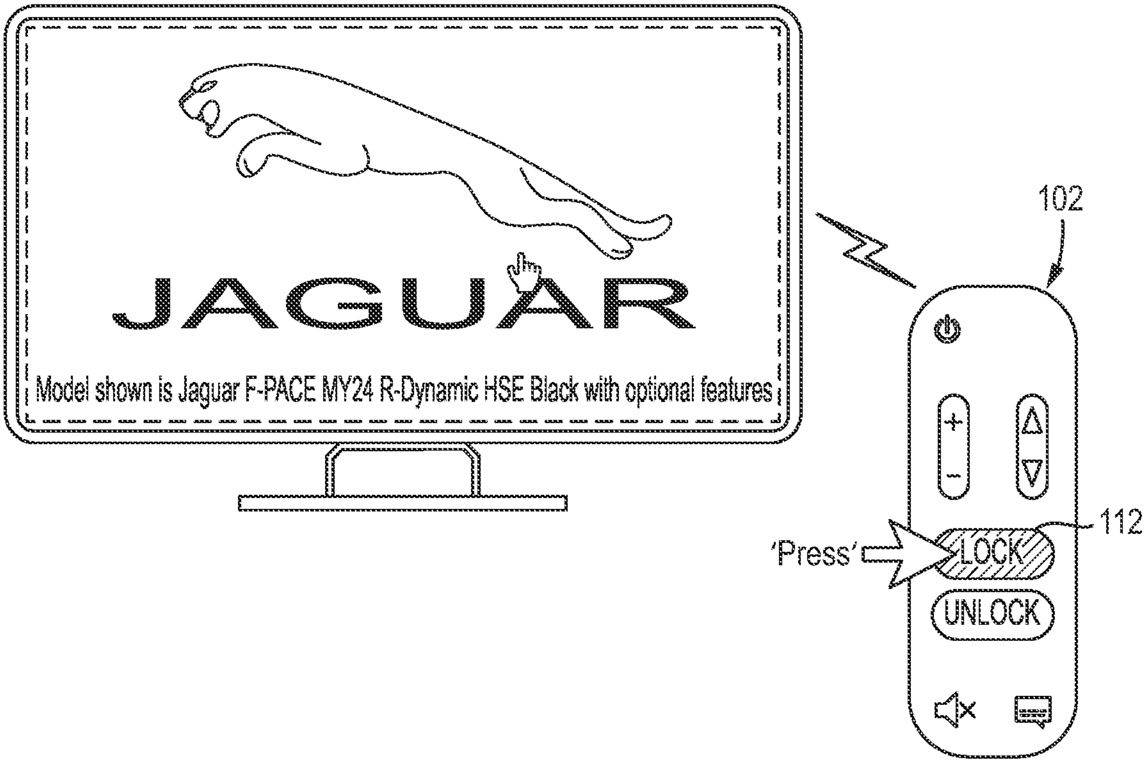

A user inconvenienced by the onset of an advertisement break (as seen in FIG. 1B) thus might consider changing to a different FAST channel (or, more generally, to a different video stream) but this is inconvenient both to the user (because the user risks missing the restart of the program they were watching) and to the advertiser (because the user is not shown the whole advert).

Figure 1C:
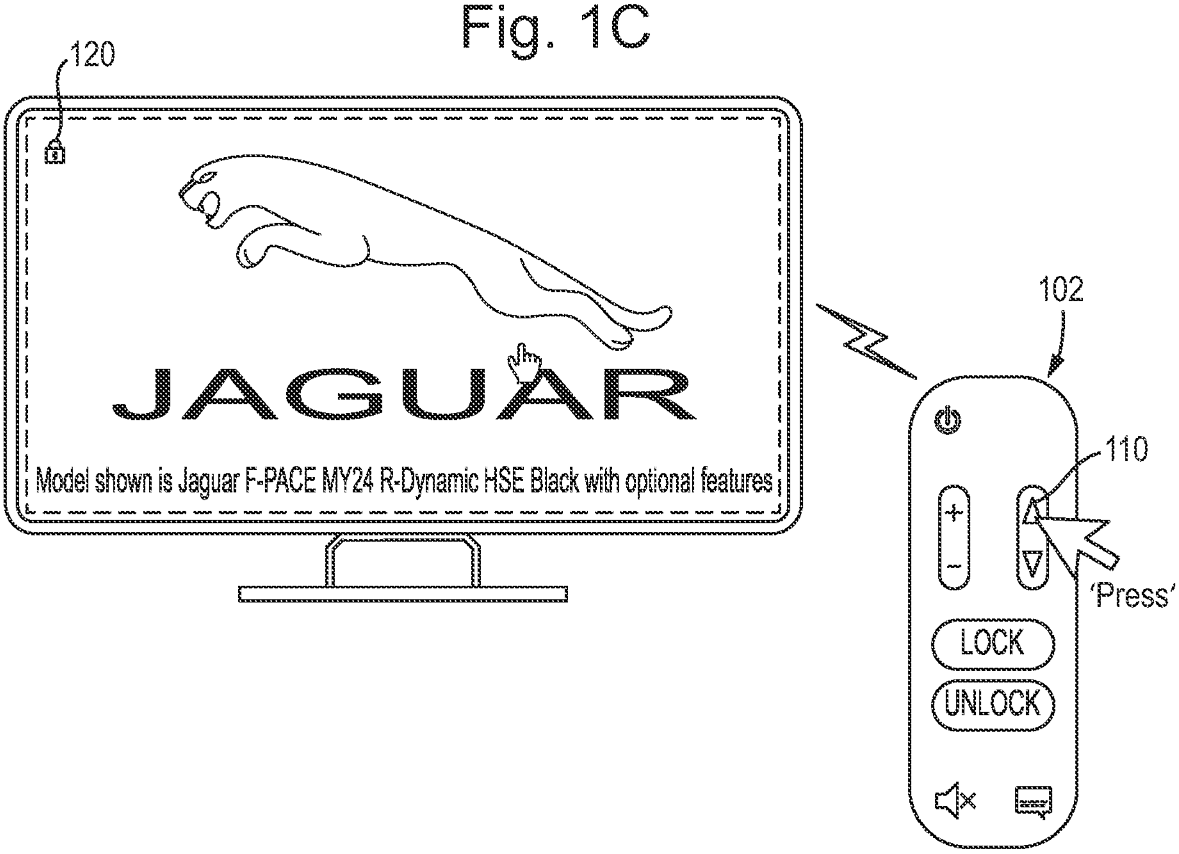

In some embodiments of the present disclosure, the user clicks on the channel lock button 112 on the remote control unit 102. This results in the remote control 102 sending a signal to the media device 100 indicating that the current channel is to be locked. On receiving the signal, the media device 100 changes the type of the video panel 104 from a channel browser video panel to a channel monitor video panel. As seen in FIG. 1C, the media device 100 may generate for display an icon 120 (in this example a padlock symbol) on the panel 104 to indicate the change in panel type.

Figure 1D:
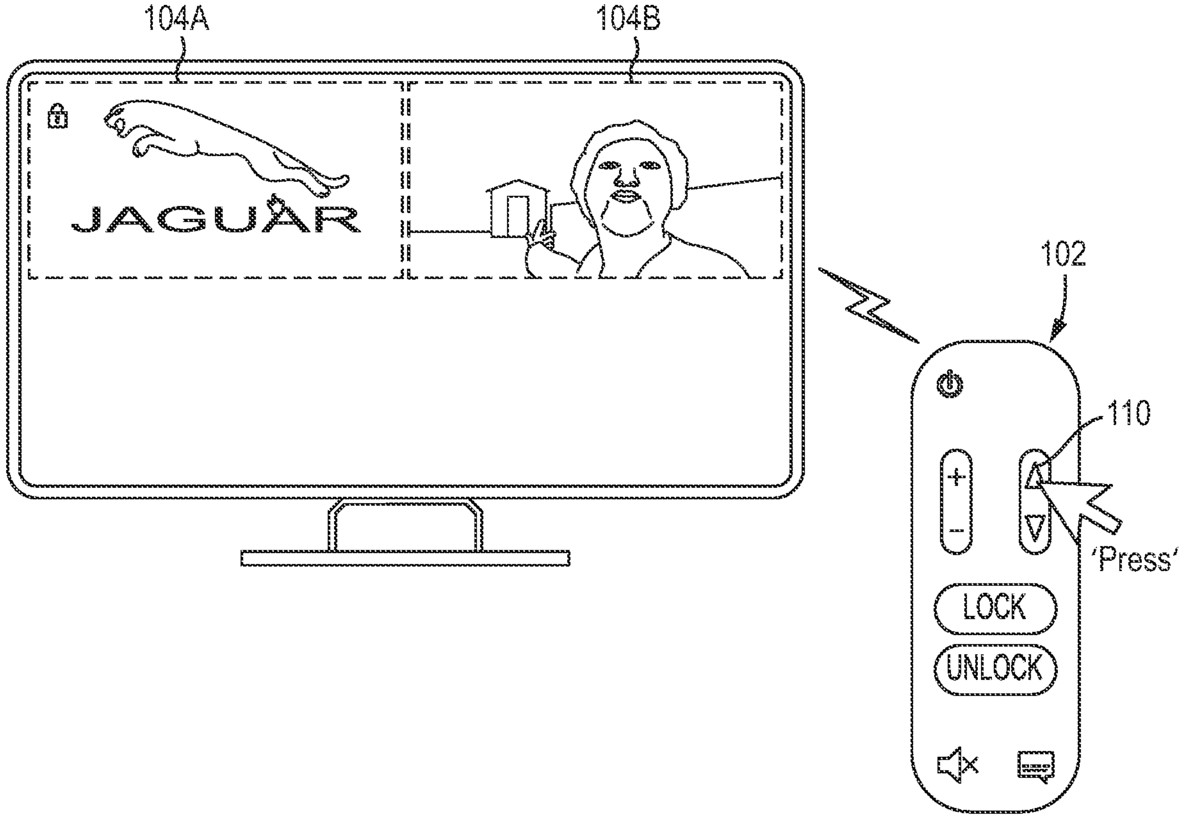

If the user presses the channel-up button 110 when all the one or more video panels on the screen are channel monitor video panels, then the media device 100 adds a channel browser video panel to the screen (as seen in the change from FIG. 1C to FIG. 1D). The display screen 101 then shows at least one channel monitor video panel 104A and a channel browser video panel 104B.

The two video panels 104A, 104B share the available video panel area 103. In this example, in order to substantially avoid distortion or cropping of the picture, each video panel 104A, 104B occupies a rectangular quarter of the video panel area 103 to offer a similar aspect ratio to that of the video panel area 103. Other panel layouts may be used.

From the situation seen in FIG. 1D, the user can trigger different responses from the media device 100 by pressing the channel up button 110, the channel lock button 122 and the channel unlock button 114. Each behavior will now be described with reference to FIGS. 1E to 1I.

By pressing the channel change button 110, the user may channel surf in the channel browser video panel 104B. As the user surfs through the channel line-up, the corresponding FAST channel is fed to the channel browser video panel 104B. An example of channel surfing can be seen in the change from FIG. 1D to FIG. 1E.

In this way, the user is able to monitor the channel in the channel monitor video panel 104A whilst browsing through channels in the channel browser video panel 104B. In the meantime, the advert in channel monitor video panel 104A continues to be displayed to the user (in the diagram, the same frame of the advert is shown, but in practice the advert may have progressed to a different frame).

Figure 1E:
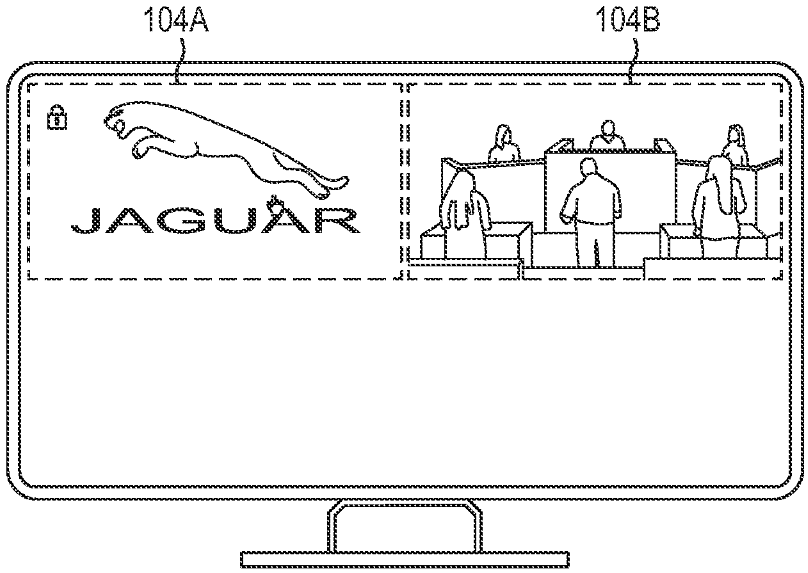
Figure 1F:
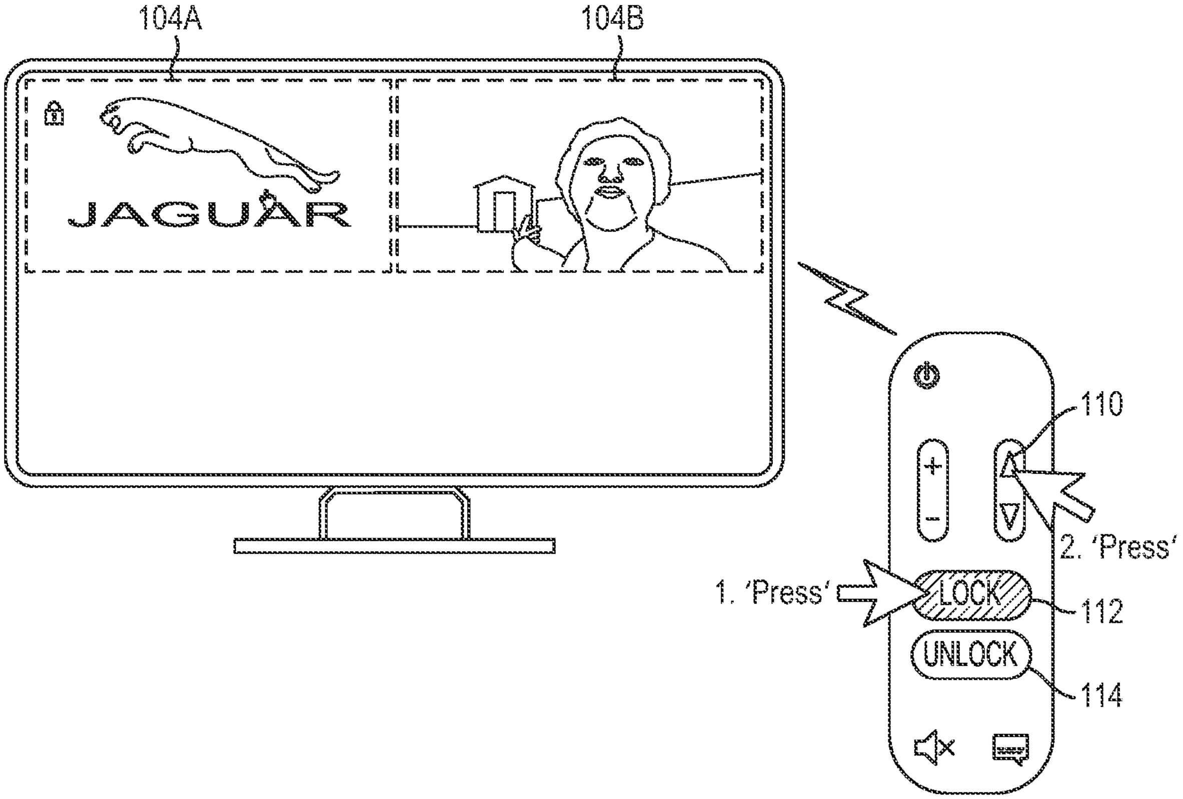
Figure 1G:
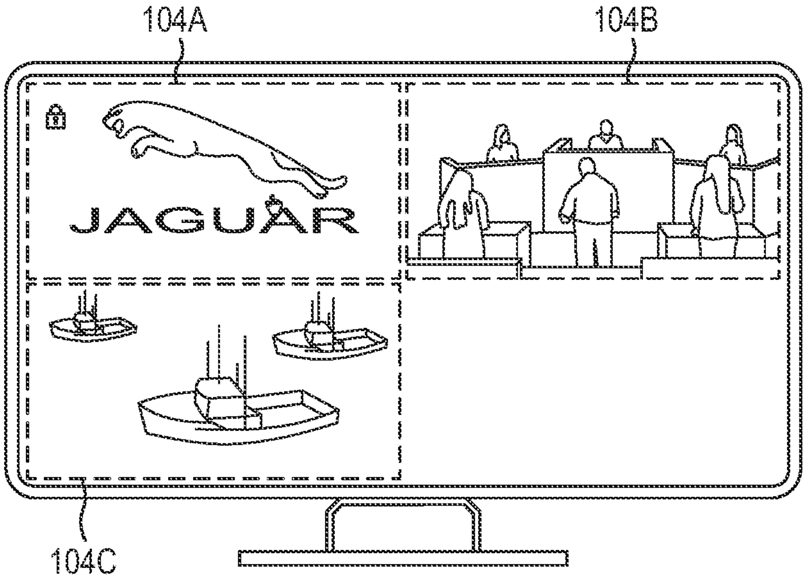

By pressing first the lock button and then the channel change button 110, the user can change a channel browser video panel in a multi-panel display layout (e.g., 104B in FIG. 1F) to a channel monitor video panel. In such a case, a similar process as that described above in relation to the change from the layout of FIG. 1B to the layout of FIG. 1C occurs, resulting, in this example, with three video panels 104A, 104B and 104C (as seen in FIG. 1E)—with video panels 104A and 104B being designated as channel monitor video panels, and video panel 104C being designated as a channel browser video panel.

Figure 1H:
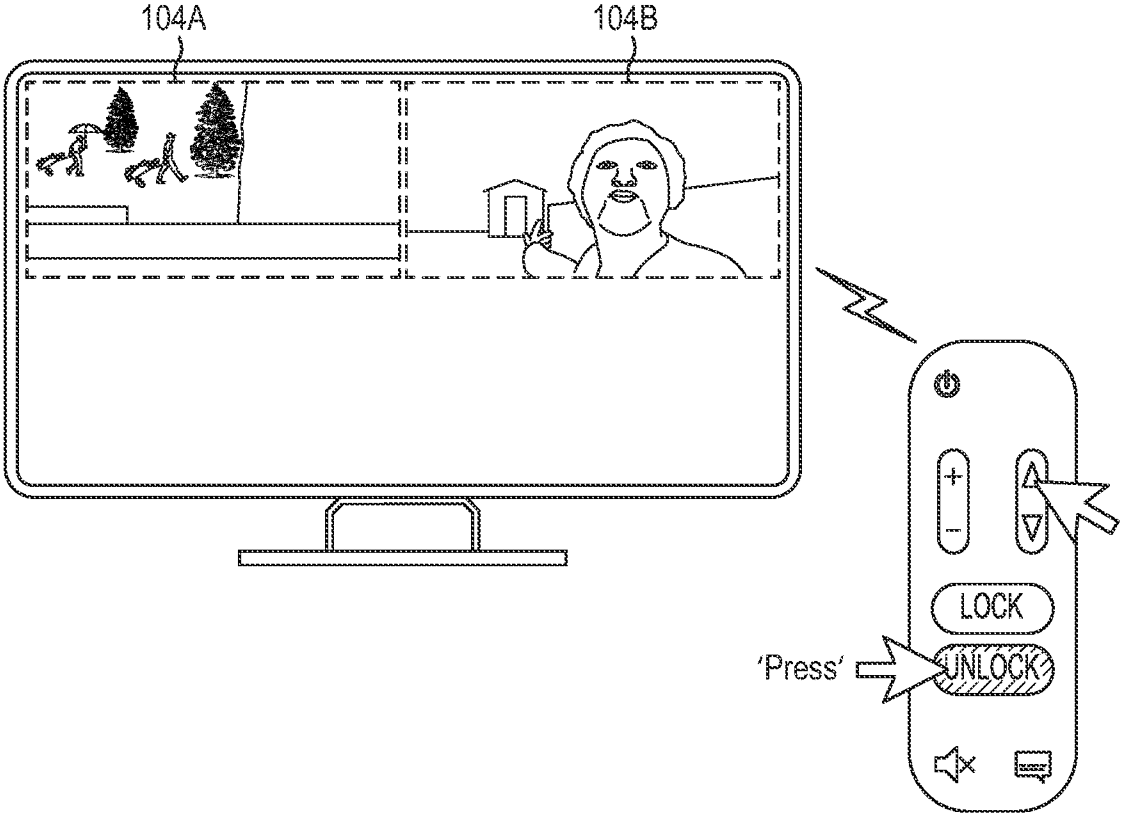
Figure 1I:
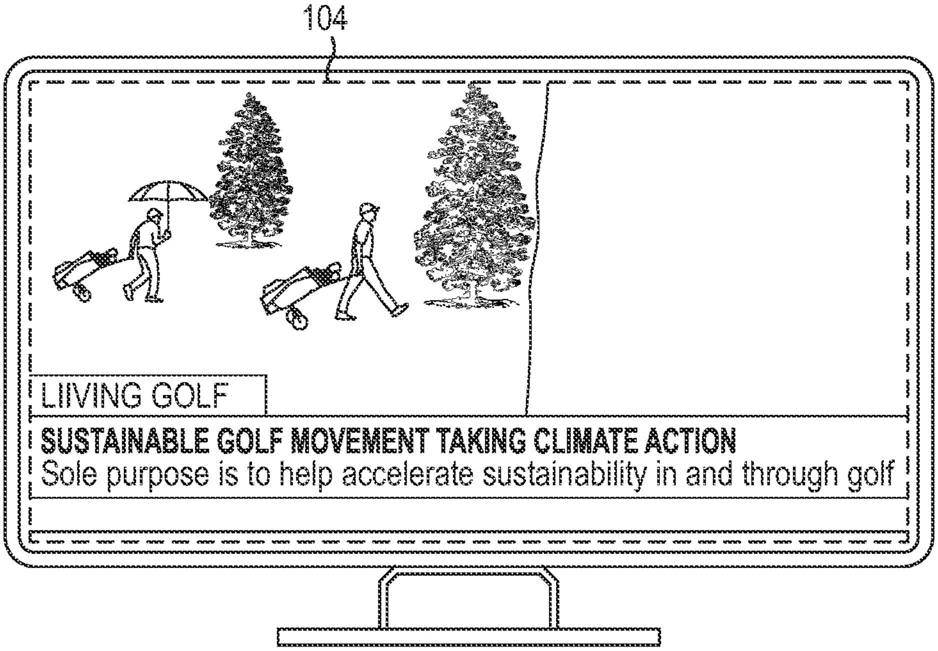

Finally, as illustrated in FIGS. 1H and 1I, in response to pressing the unlock button 114 when only one channel monitor video panel 104 is shown on the display screen 101, the media device 100 generates for display the channel shown in the channel monitor video panel in a substantially full-screen channel browser video panel—thereby returning to the situation seen in FIG. 1A.

It will be seen how, if at some point, the user notices that the advertisement break on the channel shown in the first channel monitor panel 104A has finished (e.g., when presented with the display seen in FIG. 1H), the user can press the unlock button to arrive at the full-screen channel browser video panel 104 (as seen in FIG. 1I).

In other words, a new video panel layout is generated having a single video panel 104 filling all or substantially all of the video panel area 103. The media device 100 then feeds the channel which was being monitored in first channel monitoring panel 104A to the single video panel 104.

Figure 2:
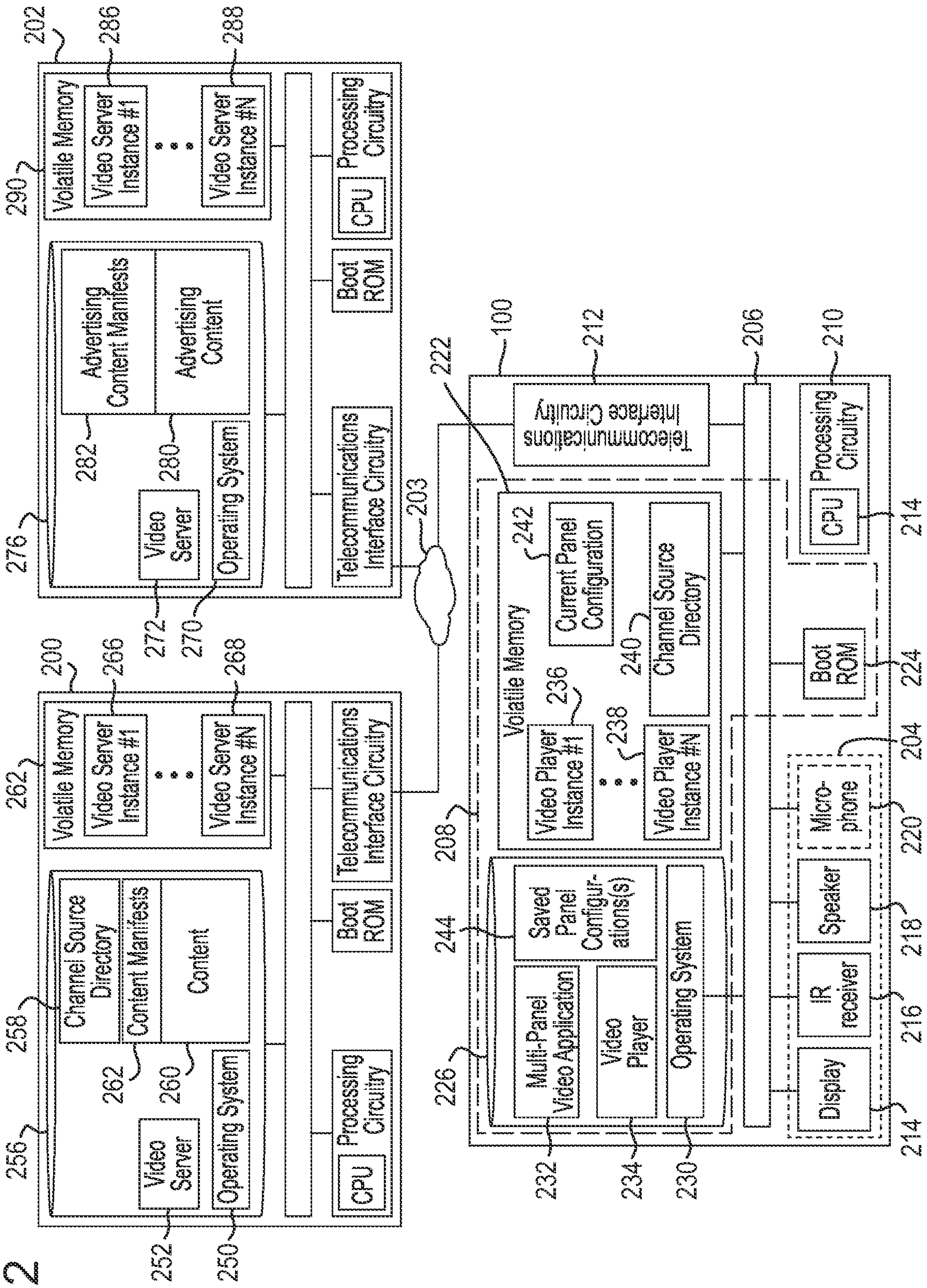
FIG. 2 illustrates a content distribution system providing mixed content including advertising content to video display apparatuses.
Figure 4:
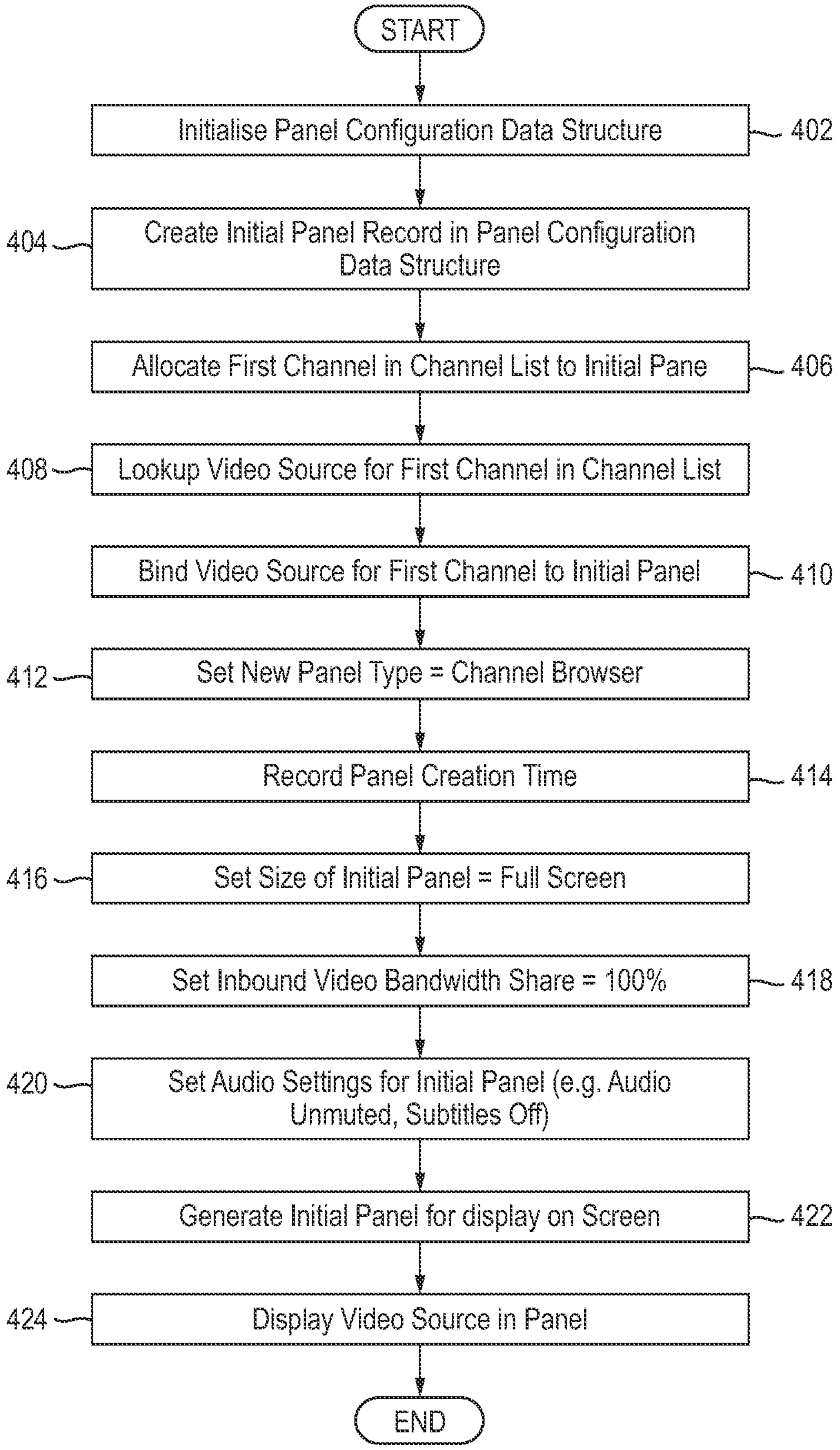
FIG. 4 illustrates the initialization of a multi-panel display application for a display apparatus in the content distribution system of FIG. 2.
Figure 5:
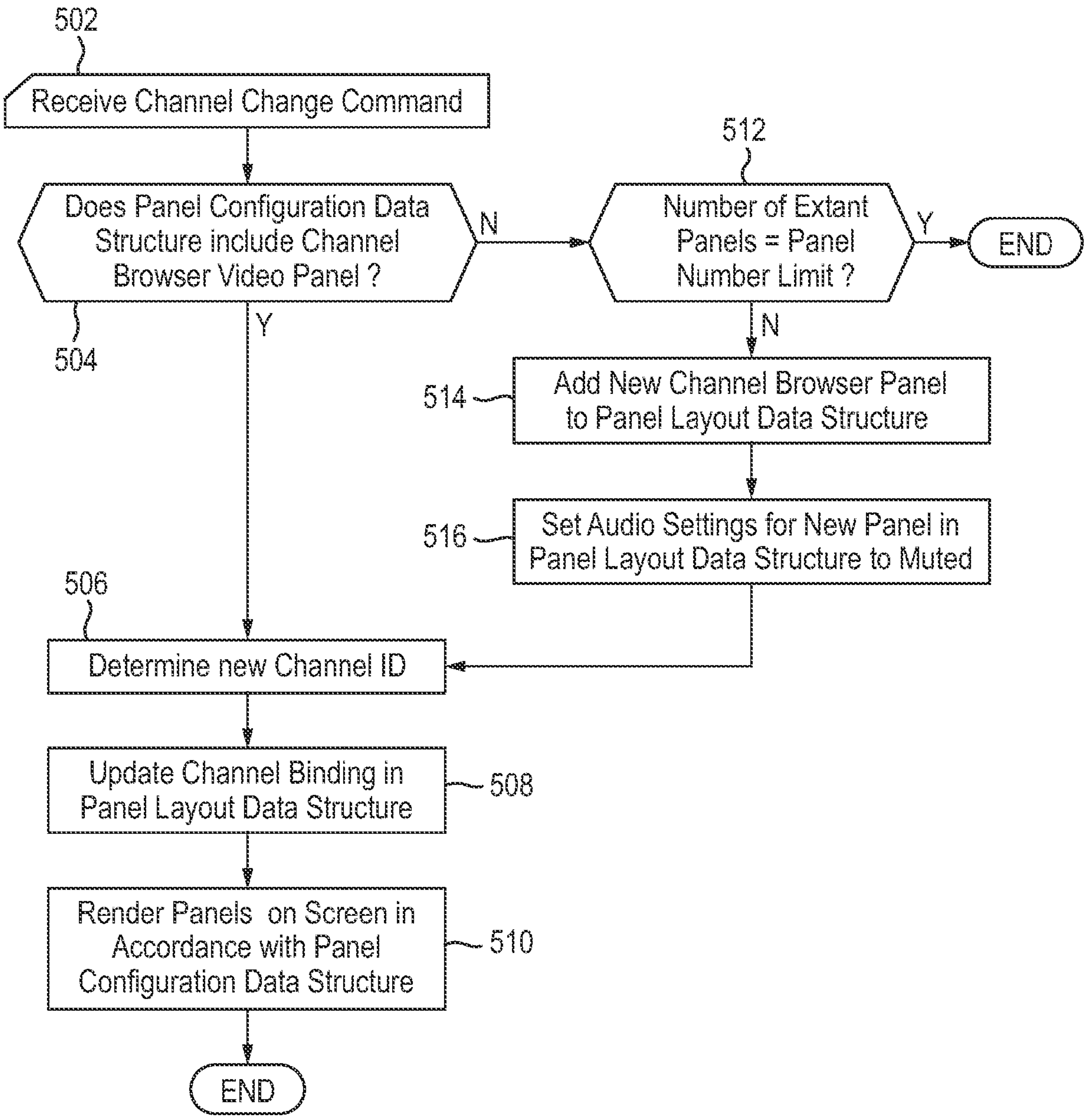
FIG. 5 illustrates a channel change handling method.
Figure 6:
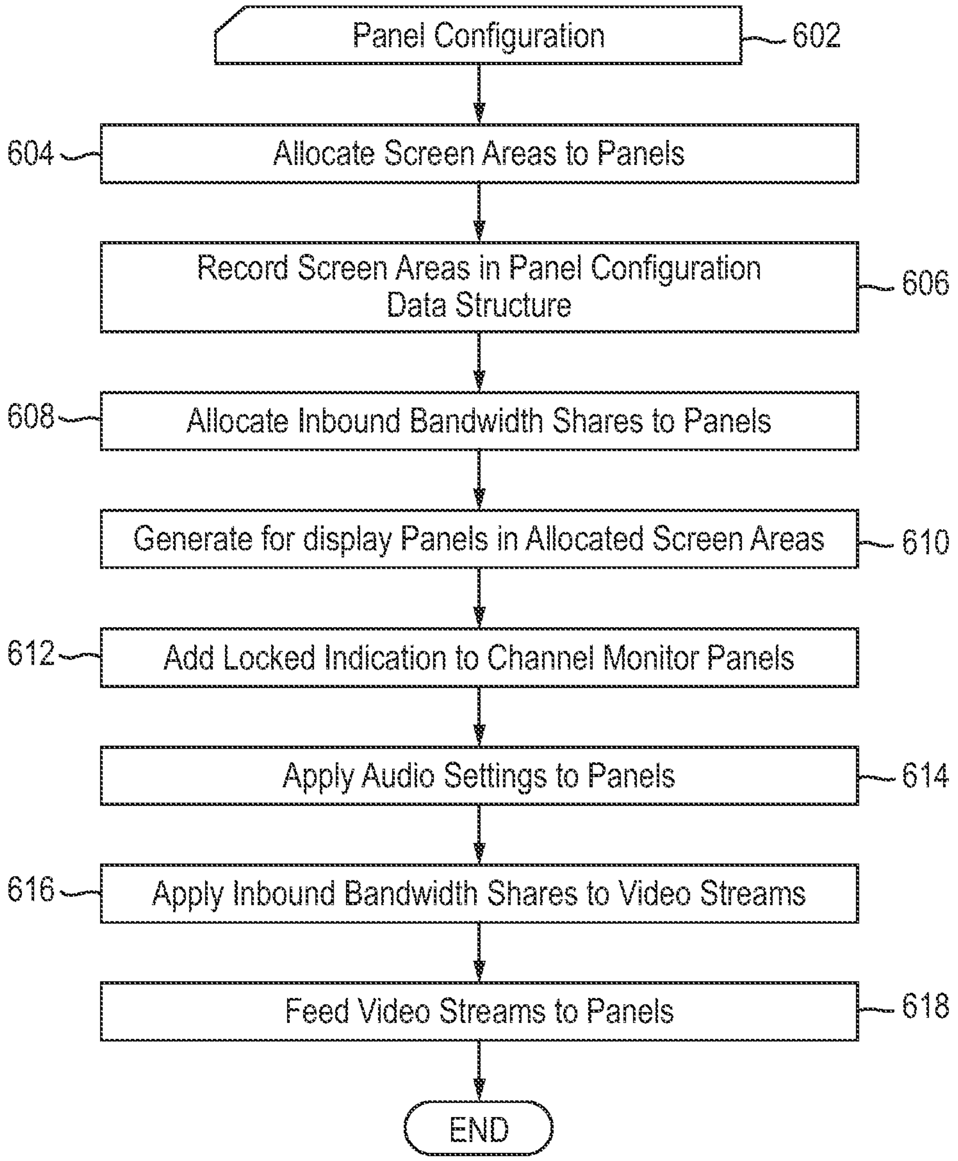
FIG. 6 illustrates a multi-panel rendering method.

A content distribution network suitable for providing a user interface like the one described in relation to FIGS. 1A to 1I is illustrated in FIG. 2.

The content provision system comprises a media device 100, content server 200 and advertising content server 202 interconnected via a telecommunications network 203.

In some embodiments, the media device 100 has the hardware architecture illustrated in FIG. 2. The media device 100 comprises control circuitry comprising user input/output circuitry 204, memory circuitry 208, processing circuitry 210, telecommunications interface circuitry 212 for interfacing the display apparatus to the telecommunications network 203, and internal communications circuitry 206 for interconnecting the different components of the control circuitry.

The user input/output circuitry 204 comprises (in the case of the media device 100 having an in-built display screen), a display screen 214, a receiver 216 for receiving signals (e.g., infra-red or Bluetooth signals) from remote control unit 102, a speaker 218, and (in cases in which a voice interface is provided) a microphone 220. In embodiments in which the media device 100 is a smartphone, then user input may be by way of a touchscreen interface instead of a remote control unit. In embodiments in which the media device 100 is a personal computer, then user input may be by way of a computer mouse, trackpad or keyboard. In some embodiments, the media device is a set-top box or streaming media player (e.g., Apple TV, or Roku Player) that are configured to connected to a display, such as a TV (e.g., via an HDMI cable).

The memory circuitry 208 comprises volatile memory 222, a boot ROM 224, and a persistent store 226 (for example solid-state storage).

The processing circuitry 210 comprises a microprocessor 214.

The internal communications circuitry 206 comprises one or more digital communication busses 300 which connect user input/output devices 214-220, microprocessor 214, volatile memory 222 and solid-state storage 226.

The content server 200 and advertising content server 202 may have a similar hardware architecture to the media device 100, save for lacking the user input/output devices 214-220. Instead, input/output interfaces for each of the servers 200, 202 are provided for use by administrators working at one or more terminals (not shown) connected to the servers 200, 202. In many embodiments, the administration terminals are connected to the servers via telecommunications network 203.

Many variations on the hardware architecture of the content distribution system are possible. At the broadest level, the content distribution system can be viewed as a combination of user input/output interface circuitry and control circuitry.

In one embodiment, the entire content distribution system could be provided on a single computer. In another embodiment, a single mixed content server may combine the processing circuitry, memory circuitry, code and data structures found in the content server 200 and advertising content server 202.

The software architecture of the media device 100 may include an operating system 230, a multi-panel video application 232 and at least one video player 234.

The multi-panel video application 232 manages a plurality of instances 236, 238 of the video player 234 and a number of data structures including a channel source directory 240, and a current panel configuration 242 in volatile memory 222, and stores saved panel configurations 244 in persistent storage 226.

The content server 200 stores an operating system 250 and a video server 252 in its persistent memory 256. In addition, the content server 200 stores a channel source directory 258, and video content 260 including content manifests 262.

The content server 200 runs a number of instances 266, 268 of the video server 252 in its volatile memory 262.

In some embodiments, the channel source directory (perhaps along with electronic program guide data for FAST channels) is instead stored in a separate server.

The advertising content server 202 stores an operating system 270 and a video server 272 in its persistent memory 276. In addition, the advertising content server 202 stores advertising video content 280 including content manifests 282.

The advertising content server 202 runs a number of instances 286, 288 of the video server 272 in its volatile memory 290.

FIG. 3A illustrates the channel source directory data structure 258 stored by the content server 200. The channel source directory data structure comprises an ordered list of video sources (e.g., Universal Resource Locators), and corresponding channel identifiers. The channel source directory data structure may be occasionally downloaded by the media device 100 and stored locally as a local channel source directory 240. As mentioned above, in some embodiments, the user may be provided with an interface enabling them to re-order the list (e.g., by moving favored channels to the top of the list).

FIG. 3B illustrates a panel configuration data structure used for the current panel configuration 242. The panel configuration data structure includes one or more panel records (each represented by a row in FIG. 3B) representing a video panel currently shown on the display screen 101. Each panel record includes a panel ID 302, an indication of the channel shown 304 in the panel, the type of the panel 306 (channel monitor panel or channel browser panel), the panel creation time 308, an indication 310 of the area of the screen taken up by the panel, a percentage allocation 312 of the inbound video bandwidth available to the multi-panel video application, and the audio settings 314,316 for the panel comprising the audio status 314 (muted, unmuted or volume level) applied to the channel being shown in the panel, and an indication 316 whether subtitles or closed captions are to be included in the panel. The allocation of inbound video bandwidth share may be expressed in other ways—for example, as a fraction, as an absolute value, as a category (e.g., high, medium, low) or in any other suitable manner.

The operation of an example embodiment of the multi-panel video application 232 will now be described with reference to FIGS. 4 to 7.

The initialization (FIG. 4) of the multi-panel video application 232 comprises initializing 402 a panel configuration data structure 242, creating 404 an initial panel record in the panel configuration data structure 242, and then populating each of the fields of the initial panel record (the following steps can be re-ordered since as long as the fields are populated, the order in which they are populated doesn't matter).

The population of the fields of the initial panel record begins with three steps (406-410) which bind a channel to the video panel represented by the panel record. Initially, the first channel in the local channel source directory 240 is allocated to the panel. Thereafter, the video source for that channel is looked up 408 in the channel source directory (FIG. 3A), and the video source is bound 410 to the initial panel. The panel type for the initial panel is set 412 to a channel browser, the creation time of the panel is recorded 414, the size of the initial panel is set 416 to full-screen, the inbound video bandwidth share for the initial panel is set 418 to one hundred per-cent, and the audio settings of the initial panel are set 420.

The multi-panel video application 232 then generates 422 for display on the screen 101 the one or more panels in accordance with the panel configuration data structure 242. In this initialization phase, the panel configuration data structure 242 includes only the initial video panel.

The video stream from the video source for the channel associated with each panel is then shown in accordance with the audio settings found in the relevant panel record.

A channel change handling process (FIG. 5) is triggered by the receipt 502 of a channel change command. A test 504 is performed to find whether the panel configuration data structure includes a channel browser video panel.

If the panel configuration data structure does include a channel browser video panel, then a sequence of steps (506, 508 and 510) updating the channel shown in the channel browser video panel is performed. The sequence of steps involves determining 506 the new channel ID, updating 508 the panel record relating to the channel browser video panel to bind the new channel to the channel browser panel, and rendering 510 the panels in the panel configuration data structure (a process which will be described with reference to FIG. 6 below).

If the panel configuration data structure does not include a channel browser video panel, then a sequence of steps 512 to 516 is performed to add 514 a channel browser video panel to the panel configuration data structure 242, and set 516 the audio setting for the channel browser video panel to muted/closed-captions on. Each of these settings might be set differently in other embodiments. In some embodiments, only one of the video panels will have the audio unmuted, and the others will have the audio muted and closed captions on.

The steps of 506, 508 of binding the channel to the new browser window and rendering the panels on the screen are then carried out as described above.

The process of rendering the one or more panels in the panel configuration data structure (FIG. 6) begins with reading 602 the panel configuration data structure. Based on the panel configuration data structure, the rendering process then allocates screen areas to the video panels in the panel configuration data structure. This allocation can be made in accordance with rules hard-coded into the multi-panel video application 232 or in accordance with updateable rules stored in a separate editable file.

The screen estate sharing rules, may for example, include:

i) if there is only one panel in the panel configuration data structure then allocate substantially the full screen area to the panel;

ii) if there are between two and four panels, then allocate the panels to four rectangular quadrants of the screen in left-to-right, top-to-bottom order in the order of panel creation time. Other layouts are possible, for example, the panel or player that is outputting audio maybe larger (e.g., a square) while the other panels are smaller (rectangular shape).

The allocated screen areas may then be recorded in the panel configuration data structure.

In addition to allocating screen estate between the video panels, the rendering process allocates the inbound bandwidth between the video player instances feeding the video to the video panels. Again, this can be done in accordance with hard-coded or editable rules.

The inbound bandwidth sharing rules, may for example, include:

i) if there is only one panel in the panel configuration data structure then allocate substantially all the inbound bandwidth allocated to the multi-panel video application to that panel;

ii) allocate all the inbound bandwidth allocated to the multi-panel video application such that each channel monitor window gets twice (or some other integer or non-integer multiple of) the bandwidth allocated to the channel browser window.

The rendering process then generates for display 610 the panels in the allocated screen areas, and adds 612 an icon or other on-screen indication to each channel monitor panel.

The audio settings found in the panel configuration data structure are then applied to the video panels. Audio settings include volume settings (which in turn includes muting the audio altogether), subtitling, closed captioning and audio description settings.

The bandwidth of the video stream is then artificially throttled in accordance with the previously-performed inbound bandwidth allocation 608. In some embodiments, one or more video player instances include adaptive bit-rate methods, which request video segments of different resolutions in dependence of the available bandwidth between the video stream source and the display apparatus (in particular, the bandwidth between the source and the video player instance). Hence, assuming panel sizes are equal, video panels with larger bandwidth allocations will request higher resolution video segments, and thus present higher resolution (and/or faster frame rate) video on the screen.

Figure 7:
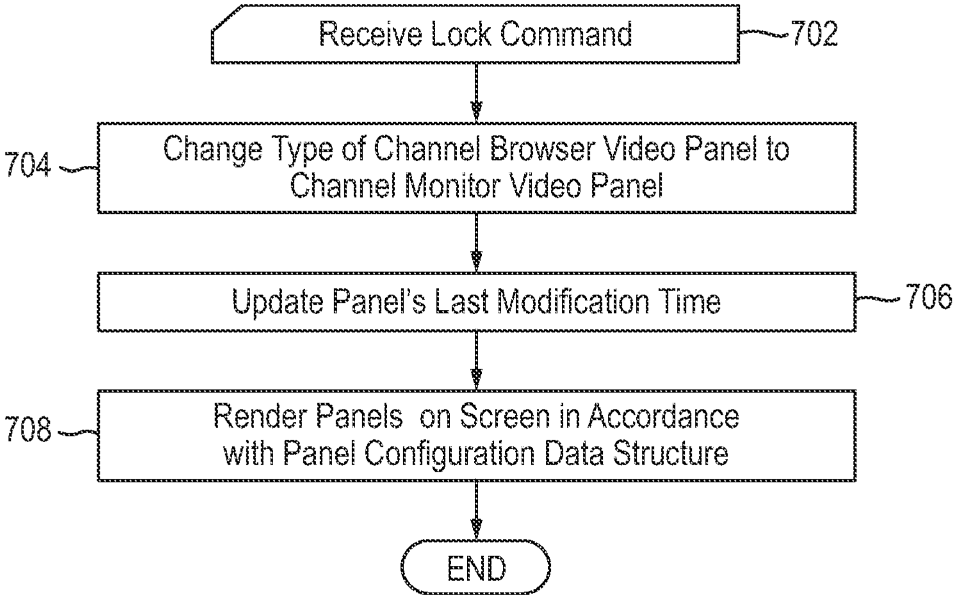
FIG. 7 illustrates how the multi-panel display application handles a panel locking command.

FIG. 7 illustrates the processing performed by the multi-panel video application 232 on receipt of a panel lock command (e.g., as a result of the user pressing the lock button 112 on the remote control 102). On receiving 702 the lock command, the application changes 704 the type of the channel browser video panel to a channel monitor video panel. This may comprise changing the panel type (FIG. 3B, field 306) to 'Monitor'. The application then updates 706 the panel's last modification time in the panel configuration data structure (FIG. 3B, field 308). Having updated the panel configuration data structure, the application then renders 708 (e.g., using the process described in relation to FIG. 6 above) the updated panel configuration on the screen. The process then ends.

Figure 8:
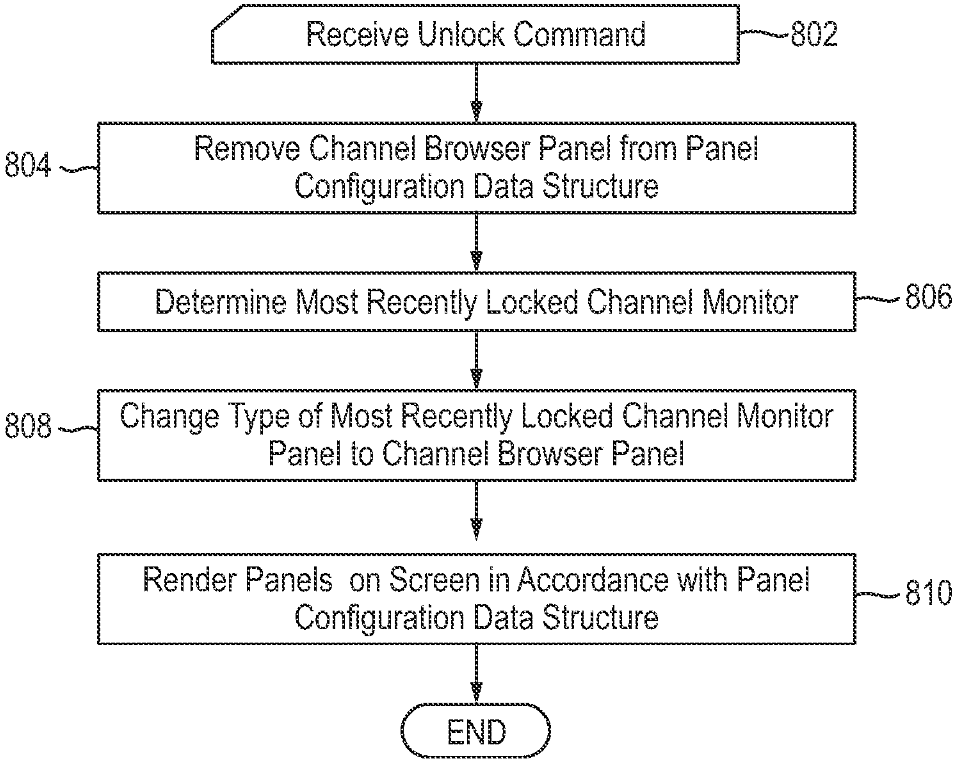
FIG. 8 illustrates how the multi-panel application handles a panel unlocking command.

FIG. 8 illustrates the processing performed by the multi-panel video application 232 on receipt of a panel unlock command (e.g., as a result of the user pressing the unlock button 112 on the remote control 102). On receiving 802 the unlock command, the application 232 removes 804 the channel browser panel from the panel configuration data structure (FIG. 3B). The application may then determine 806 the most recently locked channel monitor panel (e.g., using the last-modified field 308 in the panel configuration data structure), and change 808 the type of the most recently locked channel monitor panel to a channel browser panel. Other options for choosing which of the channel monitor panels to unlock may be used (e.g., select one at random, select based on position on screen, select the earliest locked channel monitor panel, etc.). Having updated the panel configuration data structure, the application 232 then renders 810 (e.g., using the process described in relation to FIG. 6 above), the updated panel configuration on the screen.

Figure 9:
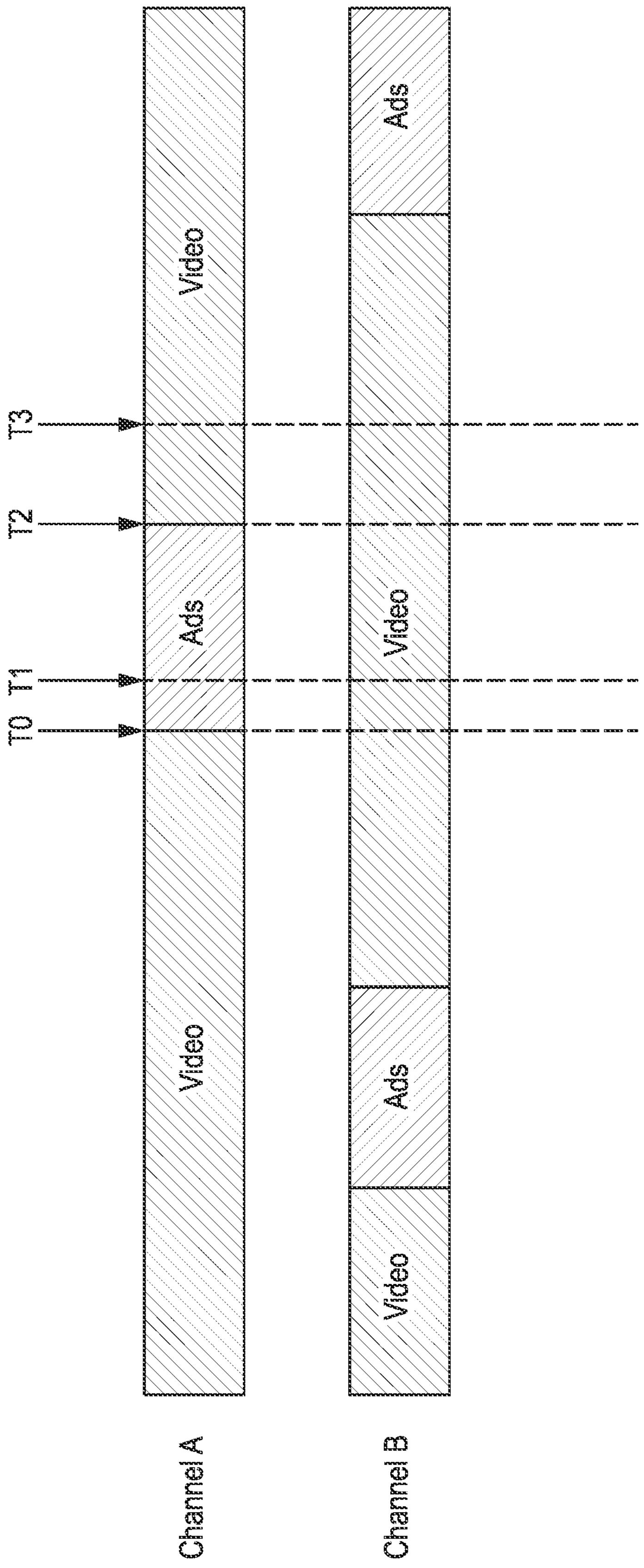
FIG. 9 illustrates how a user of a conventional television might experience imperfect ad-skipping when channel surfing.

FIG. 9 illustrates user behavior when operating a conventional television to channel surf in response to the occurrence of an advertising break on a linear television channel being shown on the television. The program on channel A is interrupted at time T0 by the start of an advertising break. The user does not wish to watch adverts, so at a time T1, after a user reaction time (T1–T0), the user operates the remote control to cause channel B to be shown on the screen instead of channel A. The television continues to show channel B (or it may show a different channel in response to the user operating the remote control to cause further channel changes) until a time T3 at which the user A guesses the advert break on channel A might have finished, and hence operates the remote control to switch back to channel A. In the interim, unbeknownst to the user, the advert break on channel A actually ended at time T2. This can cause a user to miss a portion (T3–T2) of the program they were watching before channel surfing. The duration of the missed portion might, for example, be ten seconds to three minutes.

Figure 10A:
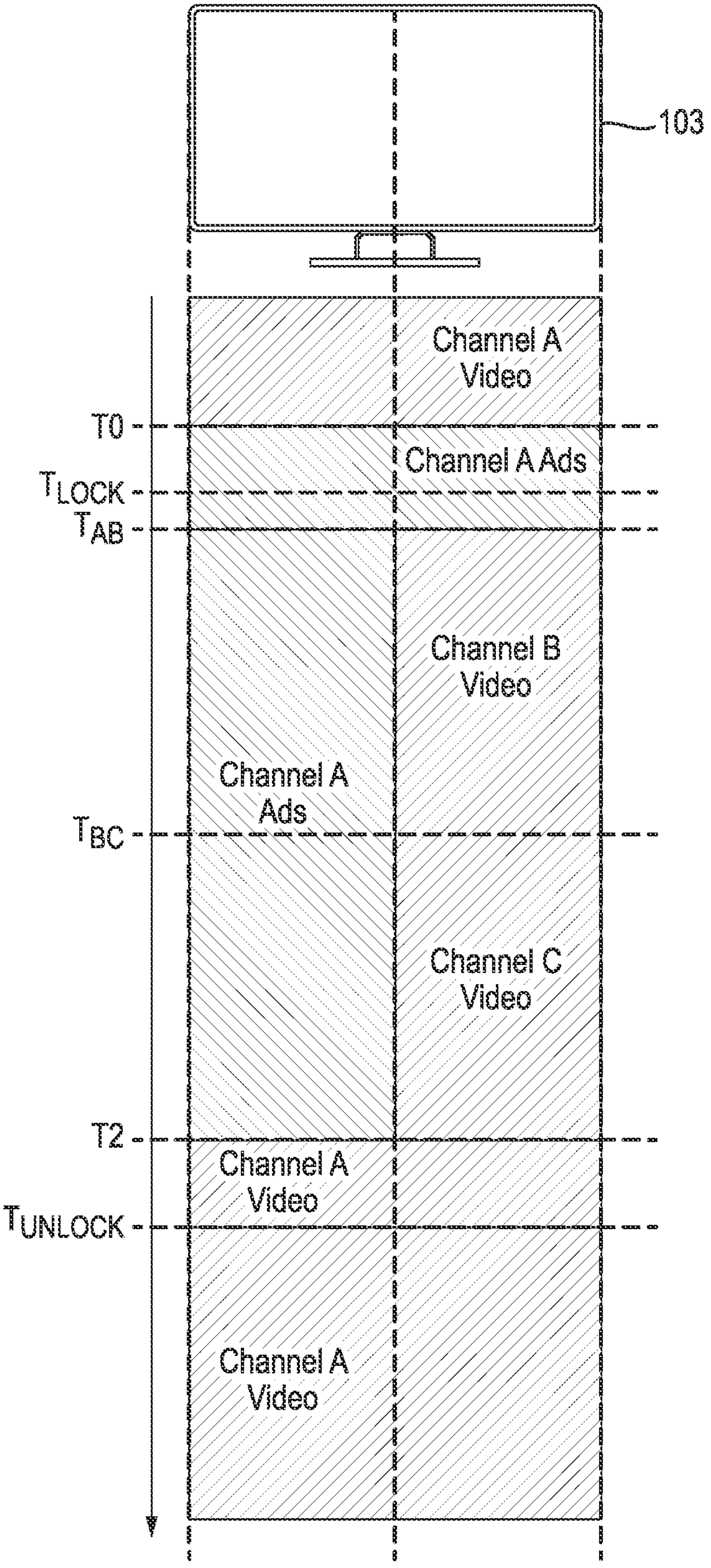
FIGS. 10A to 10C illustrate an embodiment in which the occurrence of one or more advertisement presentations in a video panel drives the operation of the multi-panel display application.

FIG. 10A illustrates how this might be improved in accordance with this disclosure. FIG. 10A shows how the display screen 101 (which extends left-to-right in the figure) might be allocated to different channels over time (time increases downwardly in the figure).

Initially, the screen is showing a first channel (channel A) full screen. At a particular time (T0), an advertisement break starts on channel A. In response, the user locks the panel (in this case the initial channel browser panel takes up substantially all the display screen 101) at a time $T_{LOCK}$. This causes the lock icon to appear on the screen (e.g., as seen in FIG. 1B, item 120). Shortly afterwards, at time $T_{AB}$, the user presses the channel up button 110 on the remote control 102 which causes a channel change process to be performed (right-hand branch of FIG. 5)—in particular it causes two panels to be shown on the screen: one locked channel monitor panel showing the first channel, and a channel browser panel showing a second channel (channel B). Whilst the adverts continue to be shown in the channel monitor panel, the user presses the channel up button 110 once again (at time $T_{BC}$), once again causing the channel change process to be performed (on this occasion, the left-hand branch of the processing shown in FIG. 5), and thus causing a third channel (channel C) to be displayed in the channel browser panel. The user then reacts to the advert break on the channel A finishing at time T2 by pressing the unlock button 114 on the remote control 102, causing the unlock command handling process (FIG. 8) to be performed to generate a single (full screen) video panel showing channel A to be displayed on the screen.

In some embodiments, if channel A is displayed in a channel monitor panel, then channel A is removed from the channel line-up which is used to respond to channel up/channel down commands in the channel browser panel. The channel line-up may be derived from the channel list by adding a flag to each channel in the channel list—the flag can indicate that the channel is 'displayed' or 'in-use'. Alternatively, or in addition, each channel in the channel list may be provided with an indication of the position of the channel in the channel line-up.

In some embodiments, some channels in the channel list might be marked with a parental rating (e.g., unsuitable for children). These channels may be removed from the channel line-up, or a request for a PIN might be displayed on the screen when the user browses to the corresponding position in the channel line-up. Similarly, the channel line-up may include channels that the user is not able to access (not subscribed to); again, these channels may be removed from the channel line-up, or a 'Subscribe' prompt might be displayed on the screen when the user browses to the corresponding position in the channel line-up.

Figure 10B:
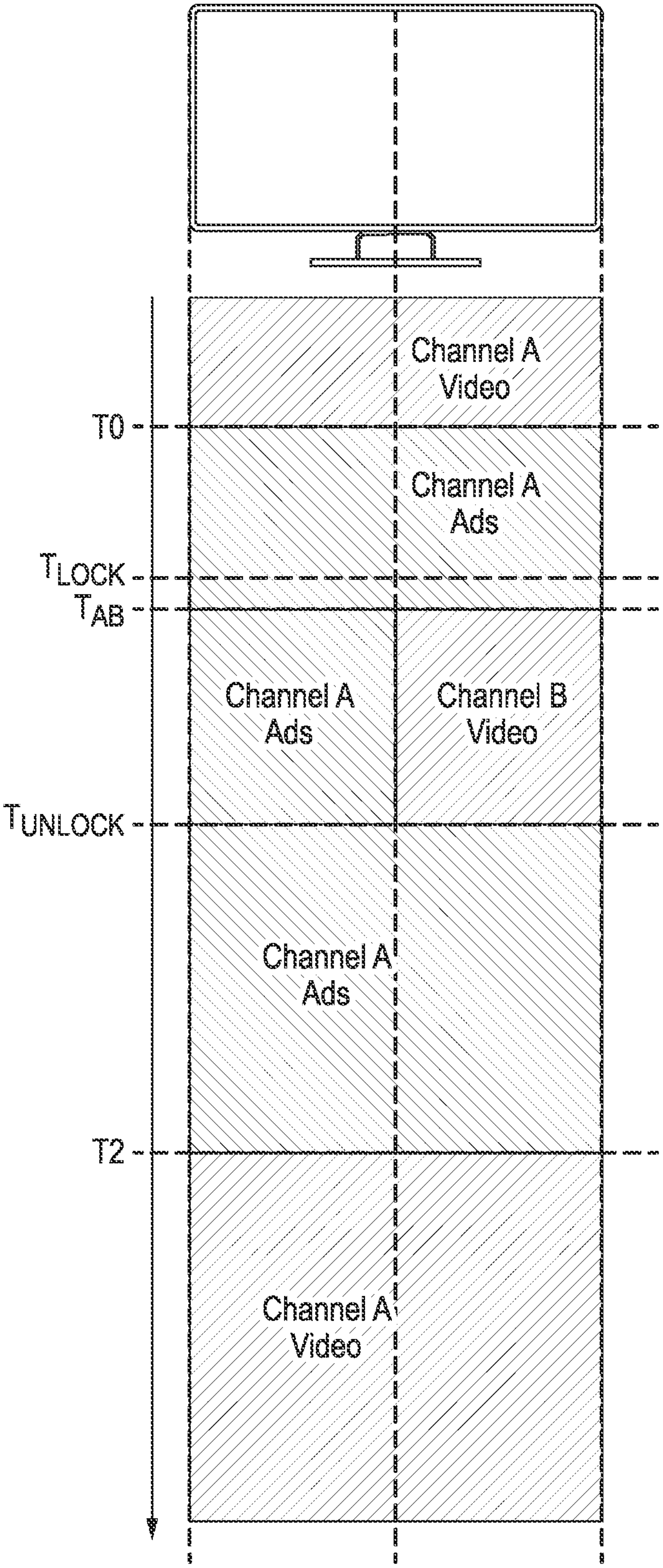

FIG. 10B is similar to FIG. 10A, but illustrates what happens if the user switches back to channel A during the advert break by pressing the unlock button—thereby triggering the unlock command processing (FIG. 8).

In some embodiments, if a channel browser window has been displaying the same channel ('persistently displayed channel') for a default time period or for a default time period after an event, then the other video panels on the screen are removed to leave a single video panel showing the persistently displayed channel. The user may be able to manually input a user-selected time period to replace the default time period.

Figure 10C:
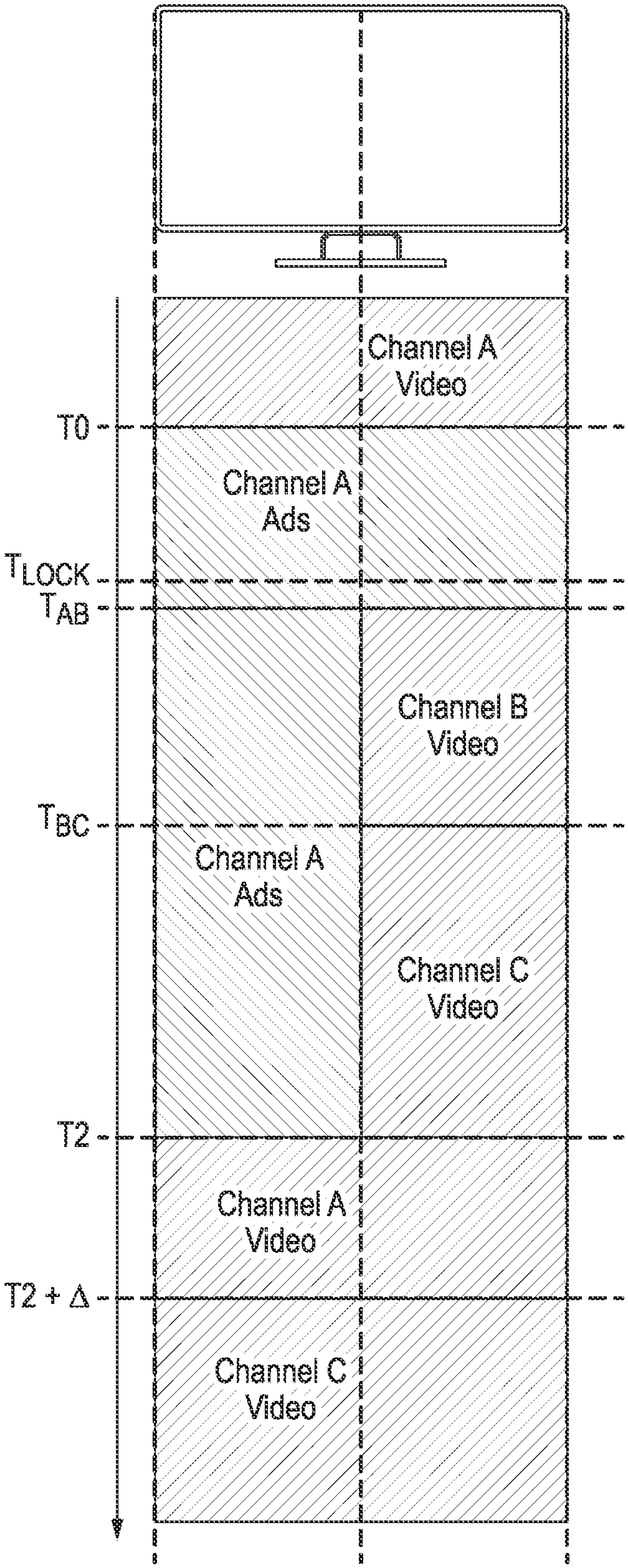

For example, as shown in FIG. 10C, if the user does not press the unlock button 114 on the remote control 102 in order to return to watching channel A full-screen within a threshold period of time (A) after the end of the advertisement break, then the channel monitor panel showing channel A may be removed from the panel configuration data structure, the screen display re-rendered, leaving a single full-screen video panel showing channel C.

FIG. 11 shows an ad impression report data structure used in some embodiments which may record both the time for which an advert was displayed and the fraction of the available screen area which was taken up by the display of the advert.

The data structure may include one or more of:

a) the time 1102 at which the display of the advert started;
b) a network address 1104 (e.g., an IP address) of the media device 100 driving the display;
c) an identifier of an advertising campaign 1106 to which the displayed advert belongs;
d) an identifier of the advert 1108;
e) a location 1110 of the media device 100;
f) an identifier 1112 of the multi-panel video application 232 controlling how the advert is displayed;
g) a version number of the operating system 1114 running on the media device;
h) a name of the advertiser 1116;
i) a name of the publisher of the advert 1118;
j) an identifier of the channel 1120 on which the advert was shown;
k) an indication of the duration of the advert 1122;
l) an indication of the fraction of the screen taken up by the advert 1124 (i.e., an indication of the size of the advert relative to the screen)
m) an indication 1126 of the absolute size of the advert when displayed.

As an alternative to the ad impression report data structure having an indication 1126 of the absolute size of the advert when displayed on the screen of the media device, the data structure could instead include an indication of the absolute size of the screen. Then, by combining the absolute size of the screen with the size 1124 of the advert relative to the screen, the absolute size of the advert could be determined.

In short, the ad impression report provides an indication of the impact of the panel/multi-panel display configuration on the size and/or impact of the advert when it was displayed.

Figure 12:
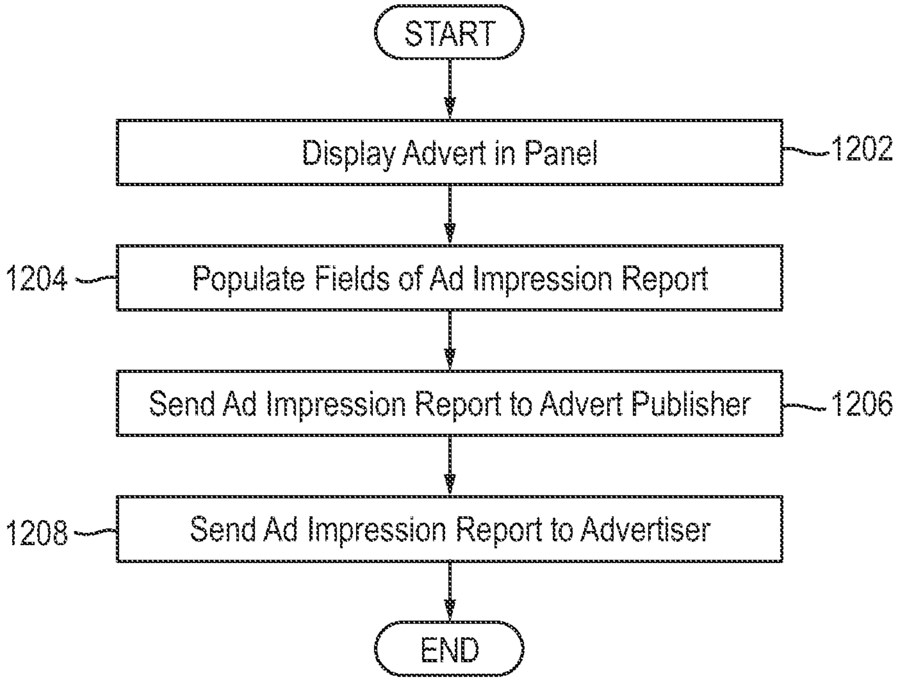
FIG. 12 illustrates a method of reporting advert impressions in the content distribution system of FIG. 2.

In some embodiments, the multi-panel video application 232 includes an advert display reporting process (FIG. 12). In accordance with that process, in response to an advert being displayed 1202 in a video panel, the fields of an advert impression report are populated 1204, and then an ad impression report is sent 1206, 1208 to one or both of the advert publisher and the advertiser.

Many variations on the above disclosure are possible. A non-exhaustive list follows.

In some embodiments, rather than relying on a common or user-specific ordering or numbering of channels, the display screen includes a channel menu featuring a plurality of channel graphical elements which the user can select from in order to choose a corresponding channel. In some embodiments, the screen area is then divided between the panel display area and a channel menu display area.

In contrast to those above-described embodiments in which newly-presented video panels were created as channel browser video panels by default, in other embodiments, video panels could be designated as channel-locked video panels by default, and the user would need to unlock those video panels in order to channel surf within the video panel.

In contrast to those above-described embodiments in which the channels were FAST channels delivered over the Internet, in other embodiments linear television channels may be delivered by cable, satellite or terrestrial broadcast networks.

In contrast to those above-described embodiments in which a new video panel layout was created to accommodate an additional video panel in response to a user re-designating a channel browser video panel as a channel monitor video panel, in other embodiments, the user interface may present a user with a plurality of selectable video panel layout icons. For example, a first video panel layout icon may represent a single full-screen video panel, a second icon may represent the screen halved vertically into two video panels, and a third icon may represent a screen divided into quarters. A user selection of a screen arrangement with more video panels than are currently presented on the screen can then be handled as a request to designate one or all of the video panels currently on the screen as channel monitor video panels, and to designate a new panel as a channel browser video panel. Similarly, a selection of the full-screen video panel icon can be treated as a request to present one of the video panels (e.g. the first created, or the video panel currently in focus) full-screen.

In some embodiments, the media device may be a television, and a smartphone may be configured to send commands to the television. This may involve the smartphone emulating a remote control, or the smartphone display being cast to the television.

In some embodiments, the media device may feature or drive a plurality of screens instead of a single screen. In each case, the available screen estate is shared between the video panels.

In some embodiments, the panel layout may be split-screen, L-frame, picture-in-picture (in which a first video panel lies within the area of a second video panel, and the first video panel hides or obscures that part of the second video panel it covers), or one video panel may partially overlap another video panel.

In some embodiments, instead of a newly-opened channel browser window showing the channel currently shown in the just-locked channel monitor window, a recommended channel (e.g. based on a user profile) may be shown in a newly-opened channel window.

In some embodiments, the user interface can be configured so that instead of generating a new video panel in response to a user locking a panel, a new video panel is not generated until the user requests a channel change on a locked panel. An additional dialogue step may be added in which the system presents the user with a user interface element with which the user can interact to trigger the generation of a channel browser video panel.

In some embodiments, channel monitor panels can automatically revert to channel browser panels after a predetermined or user-specified period of time.

In some embodiments, in order to drive a client device to lower the resolution of the display in one panel relative to another, the manifest provided to that client device (as part of an adaptive bit-rate implementation) is manipulated to remove references to higher bitrate segments or chunks. For example, any video player instance in browse mode (if there's at least one video player instance in persistent mode) may be provided with a manifest which has been stripped of higher-resolution options. In one embodiment, the server is aware of the status of the video player instance (e.g., browse mode) and sends a manifest that includes access to one lower bitrate rendition and therefore forces the video player instance to request lower bit rate segments. The server may strip off renditions from an existing manifest to remove references to specific higher bitrate renditions. The status of the video player instance maybe communicated to the streaming server 200 when a channel is requested and if the channel request will result in two or more video players generating representations of respective channels on the screen. The streaming server 200 may then respond by sending a manifest which lacks references to higher bit-rate renditions found in an original manifest.

In some embodiments, there is additional processing which detects that two panels are showing the same channel, and removes one of the two panels in response. It may be that two panels have to be shown for a threshold minimum of time before the removal of one of the panels is triggered.

In some embodiments, the layout and sizes of the video panels can be adjusted by the user.

In some embodiments, the user may be presented with a selectable interface option to enable the use of a multi-panel display. For example, the user may be presented with a prompt “Browse in Multi-view)?”

In some embodiments, when the user switches to full screen on one of the channels or panels, the system may record the panel configuration data structure prior to the switch. The recorded panel configuration data may be accessible for a period of time for content discovery. For instance, if the user were to move from the panel configuration illustrated in FIG. 1E to full-screen mode and thirty minutes later switch again to channel surfing, the second window would show the channel seen in FIG. 1E rather than the channel seen in FIG. 1D to start with.

Similarly, in some embodiments, the user may mark a specific layout of channels (e.g., as represented by a particular panel configuration data structure) as ‘favorite’ and label it for later retrieval. For example, a user might enjoy watching 2 sports channels (A&B) and one news channel (K) simultaneously. The user can save such layout as “My Sunday Channels” which would allow the user to retrieve the exact selection (i.e., My Sunday Channels) from the programming guide or from the suggested channels to watch, or through a voice command.

In some embodiments, a layout that is labelled as a favorite by the viewer can also be replicated for Video-on-Demand viewing (e.g., viewing content recorded from the 3 channels mentioned above). For example, if the user has series passes or individual program recordings set up for channel A, B and K, the user may not need to search for the recording associated with Channel A, and then add the recording for channel B and K to the multi-view. The user may simply select an option such as “Play Recording from My Sunday Channels”—and this may retrieve the last recorded content from all 3 channels and display them simultaneously (accessible from any user equipment such as a Streaming Media Player, tablet, etc.). If the latest recorded content from a channel was already viewed, then the multi-view layout may only include 2 programs. Therefore, the dynamic layout is dependent on availability of recorded content and whether the content has been viewed. If multiple programs were recorded for one or more of the channels, then invoking the command may present an option such as “Play program A or B.” Similarly, the multi-view algorithm may auto-select program A or B based on user’s watch history and viewing patterns (e.g., time of day, etc.).

Since users may sometimes record content so that they may view it ad-free, the layout of the channels may change during content consumption. For example, in response to detecting that one of the channel is about to start showing an advertisement, the instance of the player associated with that channel or program (and driving the display in the corresponding video panel) may automatically skip the ads. Similarly, the layout may deprioritize the instance of the video player that is playing an ad by making it smaller or prioritizing higher bitrate requests from the other players (assuming cloud DVR is being used). Detection of an ad playing or an ad that is about to play can be determined from the manifest files for example as ads are designated as such as in the manifest.

In some embodiments of the above multi-view mode of recorded or time-shifted content viewing, the panel assignment can first be prioritized for channels. When there is no more recording for a channel, the recorded programs of other channels can take over and display in the window of that channel.

In some embodiments, hybrid multi-view browsing of linear and recorded content is enabled by having one panel showing video streamed from a FAST channel, and another panel showing video streamed from local storage (e.g., the persistent store 226 of the media device 100).

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of providing a user interface for video stream surfing on a media device, the method comprising:

receiving a first video stream from a first video source;

generating, for display in a first video stream panel on a user interface configured for simultaneous display of multiple panels, the first video stream;

determining that a non-skippable advertisement is being displayed in the first video stream;

while the non-skippable advertisement is being displayed in the first video stream, receiving a command to view a second video stream from a second video source; and based at least in part on the determining that the non-skippable advertisement was being displayed in the first video stream when the command to view the second video stream was received:

generating on the user interface an additional second video stream panel, such that the user interface simultaneously displays the first video stream panel and the second video stream panel;

arranging the first video stream panel and the second video stream panel in a particular configuration;

generating, for display in the second video stream panel, the second video stream; and locking the first video stream panel such that user interface requests to change the first video stream panel to display another video stream are disabled while the first video stream panel is locked at least for the duration of the non-skippable advertisement.

2. A method according to claim 1, wherein a size of the first video stream panel matches a size of the second video stream panel.

3. The method according to claim 2, further comprising receiving a second command to view a third video stream; and based at least in part on receiving the second command to view the third video stream, generating, for display in a third video stream panel, the third video stream, wherein a size of the third video stream panel matches the sizes of the first video stream panel and the second video stream panel.

4. The method according to claim 1, further comprising:

storing a panel configuration data structure representing video stream panel areas and associated sources for each respective video stream panel area.

5. The method according to claim 4, wherein the panel configuration data structure further comprises audio settings for each respective video stream panel area.

6. The method according to claim 4, wherein at least one of the first video source or the second video source comprises a linear television channel.

7. The method according to claim 4, wherein at least one of the first video source or the second video source comprises one or more recordings.

8. The method according to claim 1, wherein the first video stream and the second video stream are from adaptive bit rate video sources, the method further comprising allocating a greater share of inbound bandwidth to the first video stream than to the second video stream.

9. The method according to claim 1, wherein a size of the second video stream panel is less than a size of the first video stream panel.

10. The method according to claim 1, further comprising:

receiving a user interface command to lock the second video stream panel;

based at least in part on receiving the command to lock the second video stream panel:

locking the second video stream panel such that user interface requests to change the second video stream panel to display another video stream are disabled while the second video stream panel is locked; and re-arranging the first video stream panel and the second video stream panel in a new configuration different from the particular configuration.

11. The method according to claim 1, further comprising:

storing data indicative of the particular configuration in which the first video stream panel and the second video stream panel were arranged while the first video stream was displayed in the first video stream panel and the second video stream was displayed in the second video stream panel; and based at least in part on a request to watch a Video-On-Demand (VOD) replay:

generating for simultaneous display a VOD replay stream of the first video stream and a VOD replay stream of the second video stream in respective video stream panels arranged based on the data indicative of the particular configuration.

12. The method according to claim 11, further comprising:

based at least in part on a request to watch a plurality of live streams:

generating for display a first live stream of the plurality of live streams and a second live stream of the plurality of live streams in respective video stream panels arranged based on the data indicative of the particular configuration.

13. A system comprising:

input circuitry configured to receive a first video stream from a first video source;

control circuitry configured to:

generate, for display in a first video stream panel on a user interface configured for simultaneous display of multiple panels, the first video stream;

determine, while generating for display the first video stream, that the first video stream comprises a non-skippable advertisement;

command input circuitry configured to receive a command to view a second video stream from a second video source; and the control circuitry being further configured to:

based at least in part on the determining that the non-skippable advertisement was being displayed in the first video stream when the command to view the second video stream was received:

generate on the user interface an additional second video stream panel, such that the user interface simultaneously displays the first video stream panel and the second video stream panel;

arrange the first video stream panel and the second video stream panel in a particular configuration;

generate, for display in the second video stream panel, the second video stream; and lock the first video stream panel such that user interface requests to change the first video stream panel to display another video stream are disabled while the first video stream panel is locked at least for the duration of the non-skippable advertisement.

14. The system according to claim 13, wherein a size of the first video stream panel matches a size of the second video stream panel.

15. The system according to claim 13, wherein:

the command input circuitry is further configured to receive a second command to view a third video stream; and the control circuitry is further configured to, based at least in part on the command input circuitry receiving the command to view the third video stream, generate, for display in a third video stream panel, the third video stream.

16. The system according to claim 13, the control circuitry is further configured to store a panel configuration data structure representing video stream panel areas and associated sources for each respective video stream panel area.

17. The system according to claim 16, wherein the panel configuration data structure further comprises audio settings for each respective video stream panel area.

18. The system according to claim 16, wherein at least one of the first video source or the second video source comprises a linear television channel.

* * * * *